United States Patent [19]

Djurdjevic

[11] Patent Number: 5,025,758
[45] Date of Patent: Jun. 25, 1991

[54] GAS INJECTION SYSTEM

[76] Inventor: Joco Djurdjevic, 1050 Britiannia Road East, Suites 11-12, Mississauga, Ontario, Canada, L4W 4N9

[21] Appl. No.: 514,312
[22] Filed: Apr. 25, 1990
[51] Int. Cl.$^5$ ............................................... F02B 43/00
[52] U.S. Cl. ..................................... 123/527; 123/452
[58] Field of Search .................................. 123/527, 452

[56] References Cited

U.S. PATENT DOCUMENTS

| | | | |
|---|---|---|---|
| 3,659,574 | 5/1972 | Reschke et al. | 123/525 |
| 4,485,792 | 12/1984 | van der Weide | 123/527 |
| 4,489,700 | 12/1984 | van der Weide | 123/527 |
| 4,489,701 | 12/1984 | Simon | 123/432 |
| 4,503,831 | 4/1985 | Rijkeboer | 123/527 |
| 4,632,083 | 12/1986 | Reggiani | 123/527 |

Primary Examiner—E. Rollins Cross

[57] ABSTRACT

This invention relates to apparatus for metering the supply of natural gas to an internal combustion engine having an air intake manifold and throttle valve mounted therein comprising: a pressure regulator for regulating the pressure of said natural gas; a sensor plate associated with said air intake manifold and moveable in response to variations in said throttle; and a valve being actuable by said moveable sensor plate to vary the supply of natural gas to said air intake manifold in response to variations in said throttle valve so as to meter the supply of natural gas to said internal combustion engine.

19 Claims, 3 Drawing Sheets

GAS INJECTION SYSTEM

FIELD OF INVENTION

This invention relates to apparatus for metering the supply of natural gas to an internal combustion engine.

BACKGROUND TO THE INVENTION

Various methods have heretofore been devised in order to supply liquified petroleum gas (LPG) to an internal combustion engine.

For example, U.S. Pat. No. 4,485,792 teaches that upon starting of an automobile, the engine aspirates air through the intake manifold where the flow rate meter undergoes a certain deflection out of its position of rest, whereby a metering piston is displaced as well by means of a lever. In accordance with the position of the metering piston, the limiting surface of the metering piston opens the metering opening to a greater or lesser extent towards an annular groove so that a quantity of LPG is metered at the metered valve which is dependent on the quantity of aspirated air ascertained by the air flow rate meter.

Moreover, U.S. Pat. No. 4,503,831 teaches apparatus which includes a vaporizer pressure regulating valve downstream of which a metering valve having a metering piston is disposed which is being moveable in a guide bore which opens a metering opening to a greater or lesser extent.

Moreover, U.S. Pat. No. 4,509,479 relates to apparatus for the air injection of liquid gas whereby the mixture of liquid gas and air can be influenced by a control pressure prevailing in a control chamber at the metering piston, and the control pressure is influenced by a control pressure regulating valve and the moveable valve element of which is engaged on one said by the intake tube pressure upstream of the air flow rate meter.

Yet another arrangement is shown by U.S. Pat. No. 4,489,700 which relates to a method for supplying an internal combustion engine with liquified petroleum gas as fuel and to an fuel supply system for an internal combustion engine which supplies the LPG to the engine. Finally, U.S. Pat. No. 1,954,968 teaches automatic fuel proportioning device for gas engines.

It should be noted that the prior art patents referred to herein basically relate to a system for metering LPG.

Natural gas has, over the recent years, become a more popular fuel source for internal combustion engines for a variety of reasons, including the sensitivity of the general public in attempting to free our environment of pollutants. In this regard, it is generally felt that natural gas which is used as a fuel source produces less pollutants than LPG. Accordingly, various kits and other mechanisms have been utilized in the past in order to convert LPG internal combustion engines to run on natural gas.

It is an object of this invention to provide an improved apparatus for metering the supply of natural gas to an internal combustion engine which may be initially installed in an internal combustion engine, or be used as a kit in order to convert an internal combustion engine running on natural gas, rather than LPG.

The broadest aspect of this invention relates to apparatus for metering the supply of natural gas to an internal combustion engine having an air intake manifold and throttle valve mounted therein comprising a pressure regulator for regulating the pressure of said natural gas, a sensor plate associated with said air intake manifold and moveable in response to variations in said throttle valve being actuable by said moveable sensor plate to vary the supply of natural gas to said air intake manifold in response to variations in said throttle valve so as to meter the supply of natural gas to said internal combustion engine.

It is another aspect of this invention to provide a method for metering the supply of natural gas to an air intake manifold having, a throttle mounted therein for an internal combustion engine comprising the steps of regulating the pressure of said natural gas from a natural gas cylinder, metering said regulated natural gas by a valve so as to apply said metered natural gas to said air intake manifold actuating said valve by sensor plate associated with said intake manifold, said sensor plate responding to variations in said throttle so as to meter the supply of natural gas to said air intake manifold.

DRAWINGS OF THE INVENTION

These and other objects and features shall now be described in relation to the following drawings.

DESCRIPTION OF INVENTION

Like parts have been given like numbers throughout the Figures.

Figure 1:
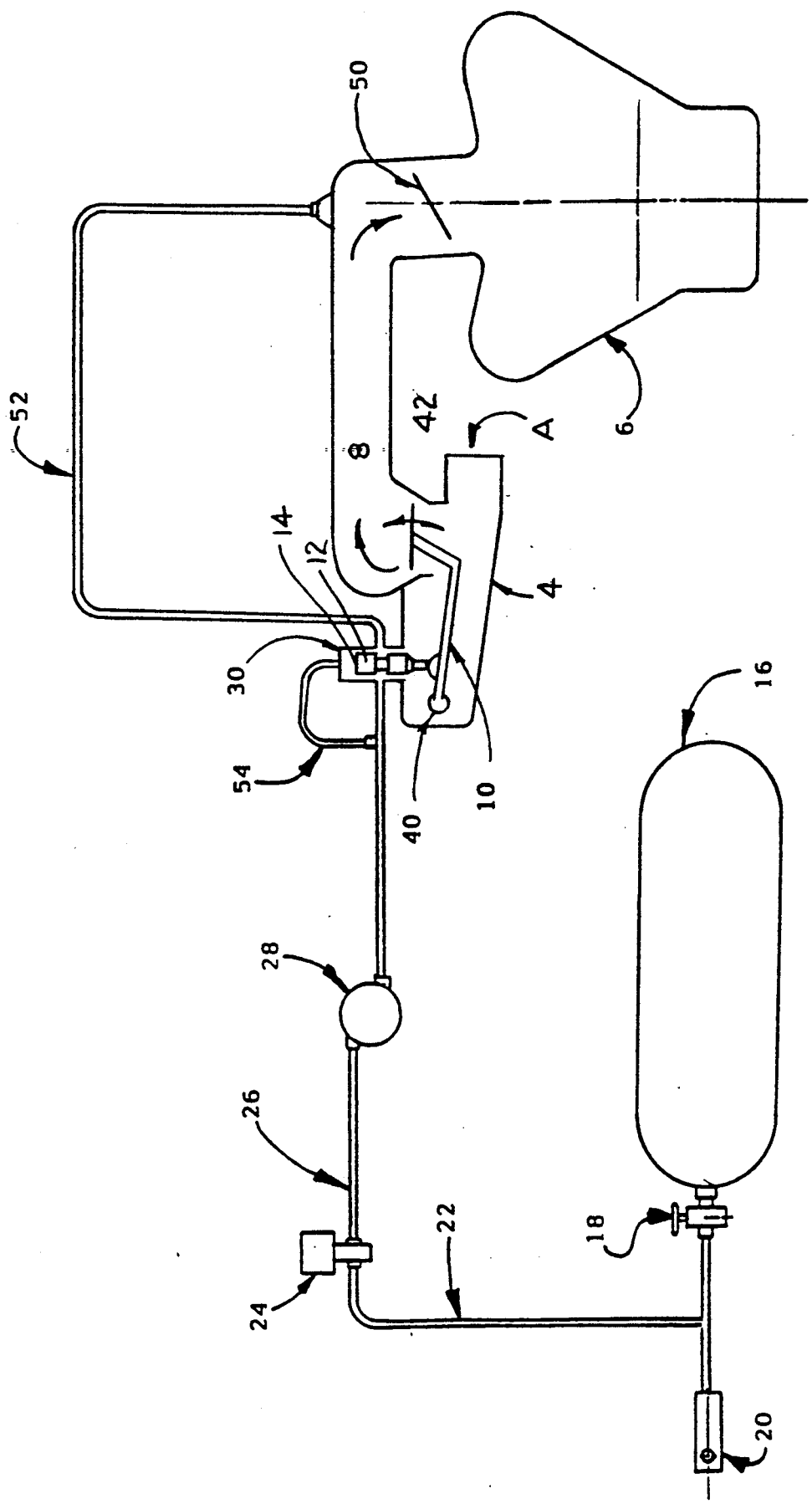
FIG. 1 is a plan view of one embodiment of the invention.

FIG. 1 generally discloses the apparatus 2 for metering the supply of natural gas into an air intake manifold 3. The apparatus 2 also includes an air intake housing 4 which is connected to air intake manifold 3 by way of flexible hose section 191. Furthermore, the air intake housing 4 is adapted to receive an air supply into the intake air hose section of the intake housing 4 as illustrated by arrow A in FIG. 1.

Generally speaking, the apparatus 2 for metering the natural gas supply into the air intake manifold 3 of internal combustion engine 6 includes a sensor plate 8, pivotal arm 10, and metering valve or piston 12 which is adapted to be slidingly received within chamber 14 as shown in FIG. 1.

More particularly, the natural gas is stored in a gas cylinder 16 which has a shut off valve 18. The gas cylinder 16 includes a fill valve 20 in a manner well known to those persons skilled in the art.

Stainless steel tubing or conduit 22 is used to communicate natural gas stored in gas cylinder 16 through high pressure solenoid 24 which is utilized to shut off the supply of natural gas in a manner well known to those persons skilled in the art.

Stainless steel tubing or conduit 26 communicates natural gas from high pressure solenoid 24 through pressure regulator 28. Pressure regulator 28 is utilized so as to regulate or reduce the pressure of natural gas in gas cylinder 16 which typically is stored in the range of 200-230 bar to a reduced pressure (such as for example under 10 bar) when the natural gas is delivered to the air intake manifold 3 in a manner to be more fully described herein.

Pressure regulator 28 can have 1, 2, 3 or any number of stages of regulating the pressure.

Stainless steel tubing or conduit 28 delivers the natural gas from pressure regulator 28 to the metering unit 30. The metering unit 30 is best illustrated in FIG. 2 and comprises a valve or plunger 32 which is adapted to be slidingly received within chamber 34 of metering unit 30.

The metering unit 30 includes an input natural gas opening 36 and an output natural gas opening 38.

Figure 2:
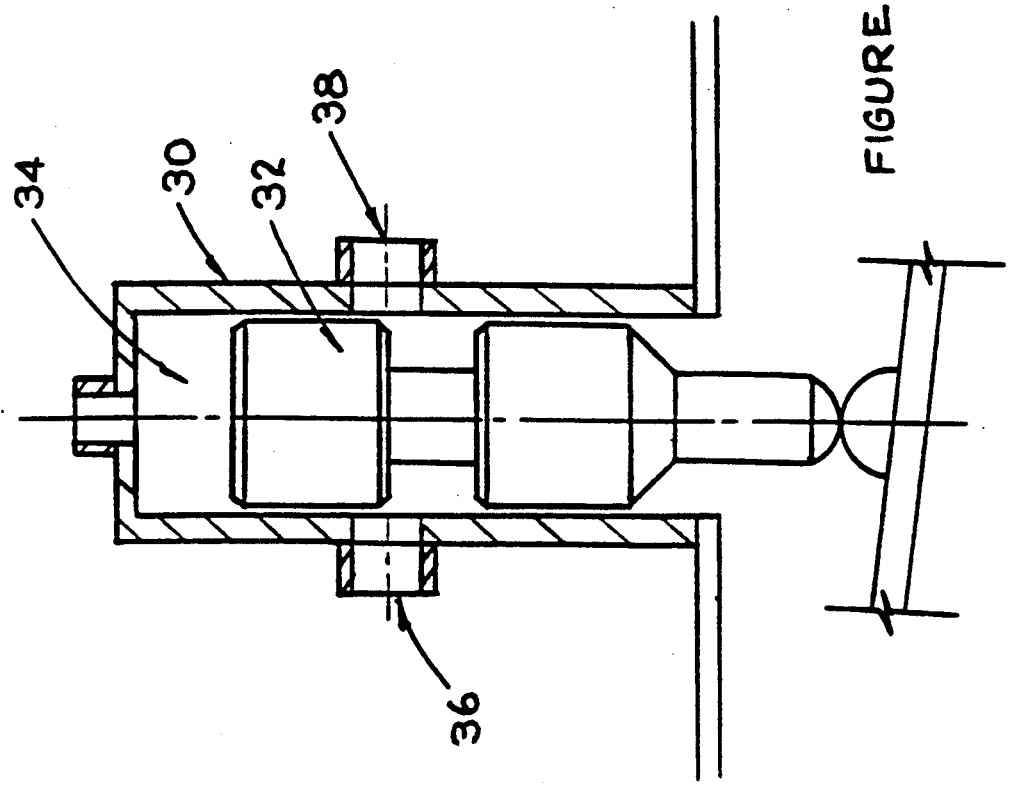
FIG. 2 is a partial view of the metering valve.

It can also be seen from FIG. 2 that the metering valve 32 is profiled so as to partially open and close the output natural gas opening 38 so as to meter or control the volume or quantity of natural gas to be introduced into the air intake manifold 3 in a manner to be more fully described herein.

The air intake housing 4 includes an arm 10 which is pivoted about one end 40 and includes the sensor plate 8 at the other end thereof.

The sensor plate 8 is adapted to seat within the conical section 42 as shown in FIG. 1.

The air intake manifold 3 also includes a throttle 50 upstream. The throttle 50 is connected to the acceleration pedal of an automobile. Accordingly, as the acceleration pedal is depressed, the throttle 50 is opened so as to draw more air into the air intake manifold 3 through air intake housing 4 by way of path A. This causes the sensor plate 8 to lift in response to a greater vacuum created behind the plate 8 thereby causing the arm 10 to pivot about end 40 so as to lift the metering valve 32 upwardly as shown in FIG. 2 and thereby allow more natural gas to flow within input natural gas opening 36 and output natural gas opening 38. Engine vacuum decreases as the throttle 50 opens. It is the force acting on the sensor plate 8, caused by the increased mass flow or increased velocity that actually forces the sensor plate 8 into the open position. The metered natural gas is then communicated to the downstream section of air intake manifold 3 by means of stainless steel tubing or conduit 52 so as to be mixed with the air and introduced into the engine 6. Accordingly, as more air is introduced into the air intake manifold 3 by way of air intake housing 4, more natural gas is mixed with such air.

It should also be noted that a gas flow control conduit 54 is utilized so as to shunt or permit a portion of the natural gas which is regulated by regulator 28 to be introduced into the chamber 34 bounded by chamber 34 and one end or the top end of metering valve 32 so as to minimize any fluctuation of the metering valve or plunger 32 as the metering valve 32 is slidingly received within chamber 34. In other words, we have a dashpot effect.

The gas pressure acting on piston 32 imposes a force on lever 10 which opposes and counter balances the aerodynamic forces on the sensor plate 8 created by the mass air flow. Therefore in addition to the dashpot effect, we also have an effective airspring providing near constant force on the lever arm 10.

Figure 3:
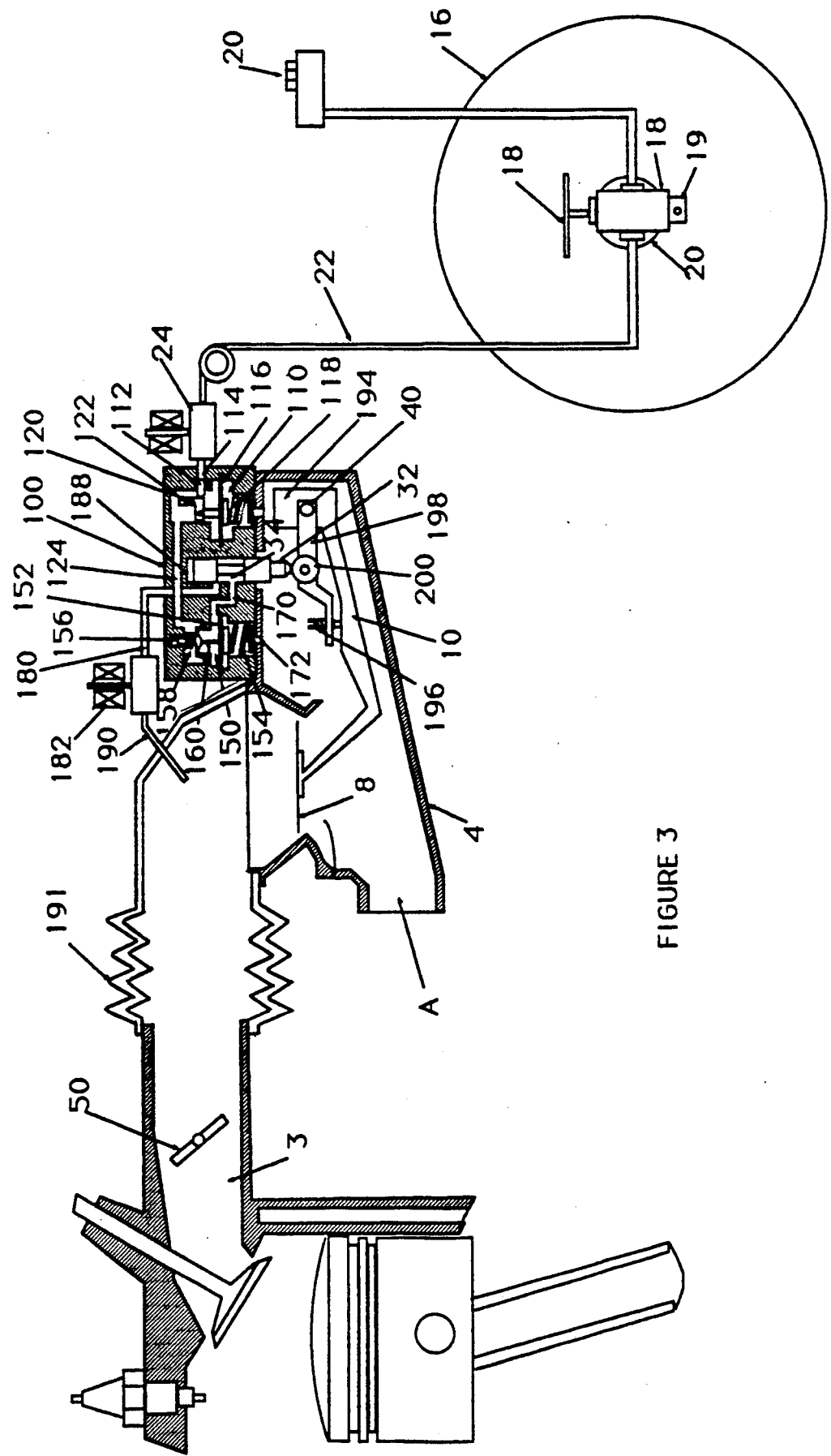
FIG. 3 is a plan view of a second embodiment of the invention.

FIG. 3 illustrates a second embodiment of the invention and includes gas cylinder 16 shut off valve 18 fill valve 20, stainless steel conduit 22, high pressure solenoid 24 with arm structure 10 which is connected to sensor plate 8.

The operation of the embodiment illustrated in FIG. 3 is similar to that illustrated in FIGS. 1 and 2 except that the metering unit 30 also includes the pressure regulator 28 of FIGS. 1 and 2 into one unit 100. In other words, the metering unit 100 includes both the chamber 34 and associated valve 32 as well as the pressure regulation function which comprises of a first stage pressure regulator 110 and second stage pressure regulator 150 in a manner to be more fully described herein.

The first stage pressure regulator 110 of metering unit 100 includes a metering slug 112 which is adapted to bear against an orifice 114.

The first stage pressure regulator 110 includes a first stage diaphragm 116, a first stage spring 118 and a first stage level assembly 120 which is adapted for pivotable movement about one end 122 thereof. In other words, as the electric solenoid 24 is activated to introduce natural gas into the first stage pressure regulator 110, the pressure of natural gas bears against the diaphragm 116 to force same against the spring 118. If the pressure of natural gas in first stage pressure regulator 110 is greater than the biasing force of the spring 118 the diaphragm 116 pushes against spring 118 and pulls the first stage level assembly downwardly so as to pivot the first stage level assembly 120 against slug 112 and reduce the amount of natural gas being introduced into the unit 110 and thereby regulating the pressure as required. In the event that the pressure of natural gas in the first stage pressure regulator 112 is less than the desired result, the biasing force of spring 118 pushes upwardly against diaphragm 116 so as to pivot the level assembly 120 about pivot point 122 so as permit the slug 112 outwardly from orifice 114 and thereby permit more natural gas into the first stage pressure regulator 112 and increase the pressure to the desired amount.

The metering unit 100 includes a conduit path 124 which permits the natural gas regulated in the first stage 110 into the second stage pressure regulator 150.

The second stage pressure regulator 150 includes second diaphragm 152, second spring 154 a second stage control valve 156 and second stage valve retaining spring 158.

The second stage pressure regulator 150 operates in a similar fashion to the first stage pressure regulator so as to further reduce the pressure of natural gas.

It should be noted however, that the stem 160 of second stage control valve is connected to the diaphragm 150 so as to transmit force from diaphragm 150 to the valve to permit the introduction of regulated natural gas through conduit pathway 170 into the input natural gas opening 36 of chamber 34.

Alternatively, the stem 160 may be adapted to be received in an aperture (not shown) of the second diaphragm 152. In this event, when the pressure in the second stage pressure regulator 150 is greater than normally expected, the pressure of natural gas would push down against the second diaphragm 152, thereby causing the stem 160 to be pulled away from the aperture (not shown) of second diaphragm 152, and thereby causing a portion of the natural gas to be vented through the aperture (not shown) past the second stage spring 154 through aperture 172 and into the air intake manifold so as to cause more natural gas to be introduced into the air intake housing 4 and air intake manifold 3 and thereby choke the engine. This is introduced as a safety feature to the invention as described herein.

The chamber 34 of unit 100 also includes an output natural gas opening 38 which communicates with stainless conduit 180 and a second electric solenoid 182 to be introduced into the air intake manifold 3 by means of conduit 190.

The arrangement shown in FIG. 3 also includes a flexible hose section 191 and illustrates the piston, valve and spark plug arrangement of the internal combustion engine.

Moreover, the arrangement as shown in FIG. 3 illustrates that the arm 10 includes a counterweight 194 and an adjustable screw 196 which is connected to the adjustable arm 198 which is pivoted about pin 40.

The adjustable screw 196 is utilized so as to adjust the natural gas and air mixture ratio. Once the mixture is adjusted the apparatus 2 as described herein requires less maintenance because the system does not require recalibration at regular intervals in the future. Since the frequency of calibration is minimized this eliminates the compulsory requirement of extensive testing of the equipment in maintaining an optimum ratio of air to natural gas mix.

The gas metering valve 32 is adapted to contact the roller pin 200.

Accordingly, the operation of the apparatus 2 as illustrated in FIG. 3 shall now be described. The natural gas is introduced into the first stage pressure regulator 110 where the pressure of the natural gas is reduced in a first stage and then introduced into the second stage natural gas pressure regulator 150 so as to reduce the pressure of the natural gas a second time to a desired level before it is introduced into the chamber 34. Thereafter, the natural gas is metered in a manner similar to that illustrated in FIGS. 1 and 2 and then introduced into the air intake manifold 3 to be mixed with the air. It should be noted that any number of stages may be utilized.

The metering unit 100 also includes a pathway or conduit 188 between conduit 124 and the chamber 34 so as to shunt or permit a portion of the natural gas into the region bounded by chamber 34 and valve 32 so as to minimize fluctuation of the valve 32 in a manner as described before.

The gas pressure acting on piston 32 imposes a force on lever 10 which opposes and counter balances the force of the counter weight 194 and the aerodynamic forces on the sensor plate 8 created by the mass airflow. Therefore in addition to the dashpot effect, we also have an effective airspring providing near constant force on the lever arm 10.

Although the preferred embodiment as well as the operation and use have been specifically described in relation to the drawings, it should be understood that variations in the preferred embodiment could be easily achieved by a skilled person in the trade without departing from the spirit of the invention. Accordingly, the invention should not be understood as being limited to the exact form revealed in the drawings.

The embodiments of the invention in which an exclusive property or privilege is claimed are defined as follows:

1. Apparatus for metering the supply of natural gas to an internal combustion engine having an air intake manifold and throttle valve mounted therein comprising:
   (a) pressure regulator means for regulating the pressure of said natural gas;
   (b) sensor plate means associated with said air intake manifold and moveable in response to variations in said throttle valve;
   (c) valve means being actuable by said moveable sensor plate means to vary the supply of natural gas to said air intake manifold in response to variations in said throttle valve so as to meter the supply of natural gas to said internal combustion engine.

2. Apparatus as claimed in claim 1 wherein said sensor plate means includes arm means associated with said air intake manifold, said arm means disposed for pivotable movement about one end thereof, and said other end of said arm means including a sensor plate whereby said sensor plate and said arm means pivotly move about said one end of said arm means in response to variations in said throttle valve.

3. Apparatus as claimed in claim 2 further including chamber means for receiving said valve means for relative slidable movement therein.

4. Apparatus as claimed in claim 3 wherein one end of said valve means contacts said arm means between said ends of said arm means, said valve means being actuable by said arm means when said sensor plate and said arm means move in response to variations in said throttle.

5. Apparatus as claimed in claim 4 wherein said other end of said valve means is disposed within said chamber means and a portion of said natural gas is fed into the region bounded by said chamber means and said other end of said valve means so as to minimize fluctuation of said valve means in response to pivotable movement of said arm means and said sensor plate in response to variations of said throttle.

6. Apparatus as claimed in claim 5 wherein said chamber means includes an input natural gas opening for receiving natural gas into said chamber means, and output natural gas opening for communicating natural gas to said air intake manifold.

7. Apparatus as claimed in claim 6 wherein said valve means control the opening and closing of said input and output natural gas openings to control the supply of natural gas to said air intake manifold in response to variations in said throttle means.

8. Apparatus as claimed in claim 7 further including high pressure solenoid means for opening or shutting off the supply of natural gas to said chamber means.

9. Apparatus as claimed in claim 8 including natural gas cylinder means for storing said natural gas.

10. Apparatus as claimed in claim 9 including stainless steel conduit means for communicating said natural gas from said natural gas cylinder means to said high pressure solenoid means, said pressure regulator means, said chamber means and to said air input manifold means.

11. Apparatus as claimed in claim 10 including adjustable means associated with said arm means for adjusting the mixture of said natural gas and air to said air intake manifold.

12. Apparatus as claimed in claim 11 wherein said pressure regulator means and said chamber means are disposed in a single unit.

13. Apparatus as claimed in claim 12 wherein said unit includes a first stage pressure regulator means for regulating the pressure of said natural gas and a second stage pressure regulating means for further regulating the pressure of said natural gas.

14. Apparatus as claimed in claim 12 wherein said unit includes multiple stage pressure regulator means for regulating the pressure of said natural gas in multiple stages.

15. In a method for metering the supply of natural gas to an air intake manifold having throttle means mounted therein for an internal combustion engine comprising the steps of:
   (a) regulating the pressure of said natural gas from natural gas cylinder means;
   (b) metering said regulated natural gas by valve means so as to apply said metered natural gas to said air intake manifold;
   (c) actuating said valve means by sensor plate means associated with said intake manifold, said sensor plate means responding to variations in said throttle so as to meter the supply of natural gas to said air intake manifold.

16. In a method as claimed in claim 15 wherein said sensor plate means actuates said valve means for slidable movement within chamber means.

17. A method as claimed in claim 16 including the step of applying a portion of said natural gas to said chamber means so as to minimize fluctuations of said valve means when said sensor plate means actuates said valve means in response to variations in said throttle means.

18. A method as claimed in claim 17 wherein said regulating and metering of said natural gas is conducted in a single unit.

19. A method as claimed in claim 17 wherein said regulating and metering of said natural gas is conducted in separate units.

* * * * *